United States Patent
Jennings

(10) Patent No.: US 7,541,315 B2
(45) Date of Patent: Jun. 2, 2009

(54) PARAFFIN INHIBITOR COMPOSITIONS AND THEIR USE IN OIL AND GAS PRODUCTION

(75) Inventor: David Wayne Jennings, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/747,982

(22) Filed: May 14, 2007

(65) Prior Publication Data
US 2007/0213231 A1 Sep. 13, 2007

Related U.S. Application Data

(63) Continuation-in-part of application No. 10/659,914, filed on Sep. 11, 2003, now abandoned.

(51) Int. Cl.
C09K 8/524 (2006.01)
E21B 43/22 (2006.01)

(52) U.S. Cl. .................. 507/90; 507/118; 507/119; 507/129; 507/134; 507/137; 507/138; 507/220; 507/221; 507/256; 507/262; 166/304

(58) Field of Classification Search ............... 507/90
See application file for complete search history.

(56) References Cited

U.S. PATENT DOCUMENTS

| | | | |
|---|---|---|---|
| 3,355,315 A | 11/1967 | Jorda et al. | 427/230 |
| 3,563,315 A | 2/1971 | Claytor et al. | 166/304 |
| 3,600,311 A | 8/1971 | Naiman et al. | 585/9 |
| 3,640,824 A | 2/1972 | Bucaram et al. | 507/90 |
| 3,682,249 A | 8/1972 | Fischer et al. | 166/305.1 |
| 3,724,553 A | 4/1973 | Snavely, Jr. et al. | 166/304 |
| 3,840,352 A | 10/1974 | Scheffel | 44/393 |
| 3,841,850 A | 10/1974 | Aaron et al. | 44/393 |
| 3,951,161 A | 4/1976 | Rohrback et al. | 137/3 |
| 4,011,906 A | 3/1977 | Alexander et al. | 166/105 |
| 4,045,360 A | 8/1977 | Fischer et al. | 252/8.3 |

(Continued)

FOREIGN PATENT DOCUMENTS

| | | |
|---|---|---|
| GB | 2058825 A | 4/1981 |
| GB | 2269824 A | 2/1994 |

*Primary Examiner*—Randy Gulakowski
*Assistant Examiner*—John J Figueroa
(74) *Attorney, Agent, or Firm*—Mossman, Kumar & Tyler, PC

(57) ABSTRACT

Disclosed are paraffin inhibitors prepared by admixing a polymer having the characteristic of inhibiting paraffin crystalline growth in formation fluid from oil and gas wells with a first solvent selected from the weak to moderate wax solvents and a second solvent selected from the strong wax solvents. Exemplary weak to moderate wax solvents include benzene, toluene, xylene, ethyl benzene, propyl benzene, trimethyl benzene and mixtures thereof. Exemplary strong wax solvents include cyclopentane, cyclohexane, carbon disulfide, decalin and mixtures thereof. The solvent system disclosed has desirably better solubility with the polymers, even at reduced temperatures, than either solvent alone. It is emphasized that this abstract is provided to comply with the rules requiring an abstract which will allow a searcher or other reader to quickly ascertain the subject matter of the technical disclosure. It is submitted with the understanding that it will be used to interpret or limit the scope or meaning of the claims. 37 CFR 1.72(b)

17 Claims, 1 Drawing Sheet

U.S. PATENT DOCUMENTS

| | | | |
|---|---|---|---|
| 4,076,728 A | 2/1978 | Maulding | 549/309 |
| 4,110,283 A | 8/1978 | Capelle | 260/23 AR |
| 4,538,682 A | 9/1985 | McManus et al. | 166/255 |
| 4,582,131 A | 4/1986 | Plummer et al. | 166/68 |
| 4,645,585 A | 2/1987 | White | 208/58 |
| 4,670,516 A | 6/1987 | Sackmann et al. | 525/327.6 |
| 4,693,312 A | 9/1987 | Lenderman | 166/279 |
| 4,737,159 A | 4/1988 | Phillips | 44/334 |
| 4,925,497 A * | 5/1990 | Thierheimer, Jr. | 134/40 |
| 4,997,580 A | 3/1991 | Karydas et al. | 252/8.3 |
| 5,039,432 A | 8/1991 | Ritter et al. | 507/90 |
| 5,103,031 A | 4/1992 | Smith, Jr. | 556/179 |
| 5,104,556 A | 4/1992 | Al-Yazdi | 252/8.552 |
| 5,503,645 A | 4/1996 | Jung et al. | 4/418 |
| 5,528,824 A | 6/1996 | Anthony et al. | 29/828 |
| 5,536,706 A | 7/1996 | Kallenbach et al. | 507/231 |
| 5,611,894 A | 3/1997 | Kawamura et al. | 196/14.5 |
| 5,847,018 A | 12/1998 | Blanpied et al. | 521/107 |
| 6,218,490 B1 | 4/2001 | Brunelli et al. | 526/258 |
| 6,593,426 B2 | 7/2003 | Krull et al. | 525/191 |
| 6,670,414 B2 | 12/2003 | Shiraishi et al. | 524/437 |
| 2002/0050355 A1 | 5/2002 | Kowalewski et al. | 166/250.05 |
| 2002/0166995 A1 | 11/2002 | Robinson et al. | 252/380 |

* cited by examiner

PARAFFIN INHIBITOR COMPOSITIONS AND THEIR USE IN OIL AND GAS PRODUCTION

CROSS REFERENCE TO RELATED APPLICATIONS

This application is a Continuation-In Part of U.S. patent application Ser. No. 10/659,914, filed on Sep. 11, 2003, and which claims priority from U.S. Provisional Patent Application No. 60/413,082, filed Sep. 24, 2002. Both of these applications are incorporated herein by reference in their entirety.

FIELD OF THE INVENTION

This invention relates to a composition useful for treating formation fluids from oil and gas wells to reduce paraffin deposits.

BACKGROUND OF THE ART

Fluids produced from oil wells penetrating an oil-bearing formation primarily include crude oil and water and are herein referred to as formation fluids. A formation fluid may also contain natural gas and natural gas condensate which may or may not be desirable and may be the primary product of a given well in which case the well is referred to as a gas/gas condensate well. A formation fluid may also contain $CO_2$ and insoluble clay and silica particles from the reservoir. Contained within the formation fluids are components that under certain conditions can precipitate and impede the production of oil and gas. These components include paraffins and asphaltenes from crude oils and gas condensates and inorganic mineral scales from formation water.

It is known in the art of oil and gas production to eliminate or mitigate the effects of undesirable paraffin, asphaltene, and scale precipitation. For example, to aid oil and gas production, many chemicals, referred herein as "additives", which include paraffin inhibitors, asphaltene inhibitors, scale inhibitors, and the like, are often injected from a surface source into wells or flowlines to treat the formation fluids flowing through such wells and flowlines to prevent or control the effects of precipitation of paraffins, asphaltenes, and mineral scale.

These additives can be injected continuously or by batches into wellbores, at wellheads, or other locations in flowlines or pipelines carrying formation fluids. In addition, an additive can be injected into a near wellbore formation via a technique commonly referred to as "squeeze" treatment, from which the additive can be slowly released into the formation fluid. Injection of additives upstream of the problem location is preferred. Sometimes, additives are introduced in connection with electrical submersible pumps, as shown for example in U.S. Pat. No. 4,582,131, or through an auxiliary line associated with a cable used with the electrical submersible pump, such as shown in U.S. Pat. No. 5,528,824. In addition, in wells without a packer in the completion, additives may be applied via pump or truck into the annular space between the tubing and the casing with a fluid flush driving the additive into the formation fluids.

Of the additives that can be added to formation fluid from oil and gas wells, the paraffin inhibitors are especially important. U.S. Pat. No. 4,110,283 to Capelle discloses that a copolymer of 4-vinyl pyridine and acrylic acid esters dispersed in an aqueous medium can prevent the deposit of solid paraffins on the walls of containers and pipelines carrying oil. U.S. Pat. No. 6,218,490 to Brunelli, et al., discloses that alcohol acrylate copolymers combined with 2- and 4-vinyl pyridine and acrylic acid esters can be used to prevent the formation of paraffin deposits. U.S. Pat. No. 3,951,161 to Rohrback, et al., discloses a method of using electrical contact resistance to detect the formation of paraffin solids in oil and gas wells. U.S. Pat. No. 4,538,682 to McManus, et al., discloses a method for removing paraffin deposits. All of these patents illustrate the need to control the formation of paraffin deposits.

Paraffin inhibitor additives are typically applied in the form of organic solutions or aqueous microemulsions or admixtures. The use of liquid additives is not without problems. At cold temperatures, such as in cold weather or deepwater subsea locations, the additives may freeze or gel during transportation or use. Supplying a source of heat, particularly for deepwater and remote well sites can be a problem. Also, when supplying additives in the form of liquids, the solid active components must be co-shipped in solution. The use of a solvent to form the solution requires that inert or non-active components must be co-shipped with the active components.

It would be desirable in the art of oil and gas production to use paraffin inhibitor compositions that have a higher concentration of active components than conventional paraffin inhibitors. It would be particularly desirable to use such compositions that allow for higher active component concentrations under cold temperatures.

SUMMARY OF THE INVENTION

In one aspect, the present invention is a paraffin inhibitor composition including: (a) a polymer having the characteristic of inhibiting paraffin crystalline growth; (b) a first solvent selected from benzene, toluene, xylene, ethyl benzene, propyl benzene, trimethyl benzene and mixtures thereof; and (c) a second solvent selected from cyclopentane, cyclohexane, carbon disulfide, decalin and mixtures thereof; wherein component (a) is dissolved in an admixture of components (b) and (c); and wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof. In another aspect, the present invention is a method for treating formation fluid from an oil and gas well comprising admixing formation fluid with a paraffin inhibitor composition including: (a) a polymer having the characteristic of inhibiting paraffin crystalline growth; (b) a first solvent selected from benzene, toluene, xylene, ethyl benzene, propyl benzene, trimethyl benzene and mixtures thereof; and (c) a second solvent selected from cyclopentane, cyclohexane, carbon disulfide, decalin and mixtures thereof; wherein component (a) is dissolved in an admixture of components (b) and (c); and wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof.

In still another aspect, the present invention is a composition of a formation fluid that has been treated to inhibit the formation of paraffin deposits including an admixture of formation fluid and a paraffin inhibitor that includes: (a) a polymer having the characteristic of inhibiting paraffin crystalline growth; (b) a first solvent selected from benzene, toluene, xylene, ethyl benzene, propyl benzene, trimethyl benzene and mixtures thereof; and (c) a second solvent selected from cyclopentane, cyclohexane, carbon disulfide, decalin and mixtures thereof; wherein component (a) is dissolved in an admixture of components (b) and (c); and wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof.

In yet another aspect, the invention is a process for treating an oil well with a paraffin inhibitor comprising injecting the paraffin inhibitor downhole into the oil well wherein the paraffin inhibitor is a composition that includes: (a) a polymer having the characteristic of inhibiting paraffin crystalline growth; (b) a first solvent selected from benzene, toluene, xylene, ethyl benzene, propyl benzene, trimethyl benzene and mixtures thereof; and (c) a second solvent selected from cyclopentane, cyclohexane, carbon disulfide, decalin and mixtures thereof; wherein component (a) is dissolved in an admixture of components (b) and (c); and wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof.

BRIEF DESCRIPTION OF THE DRAWINGS

For a detailed understanding of the present invention, reference should be made to the following detailed description of the preferred embodiments, taken in conjunction with the accompanying drawing, wherein.

DETAILED DESCRIPTION OF THE PREFERRED EMBODIMENTS

Figure 1:
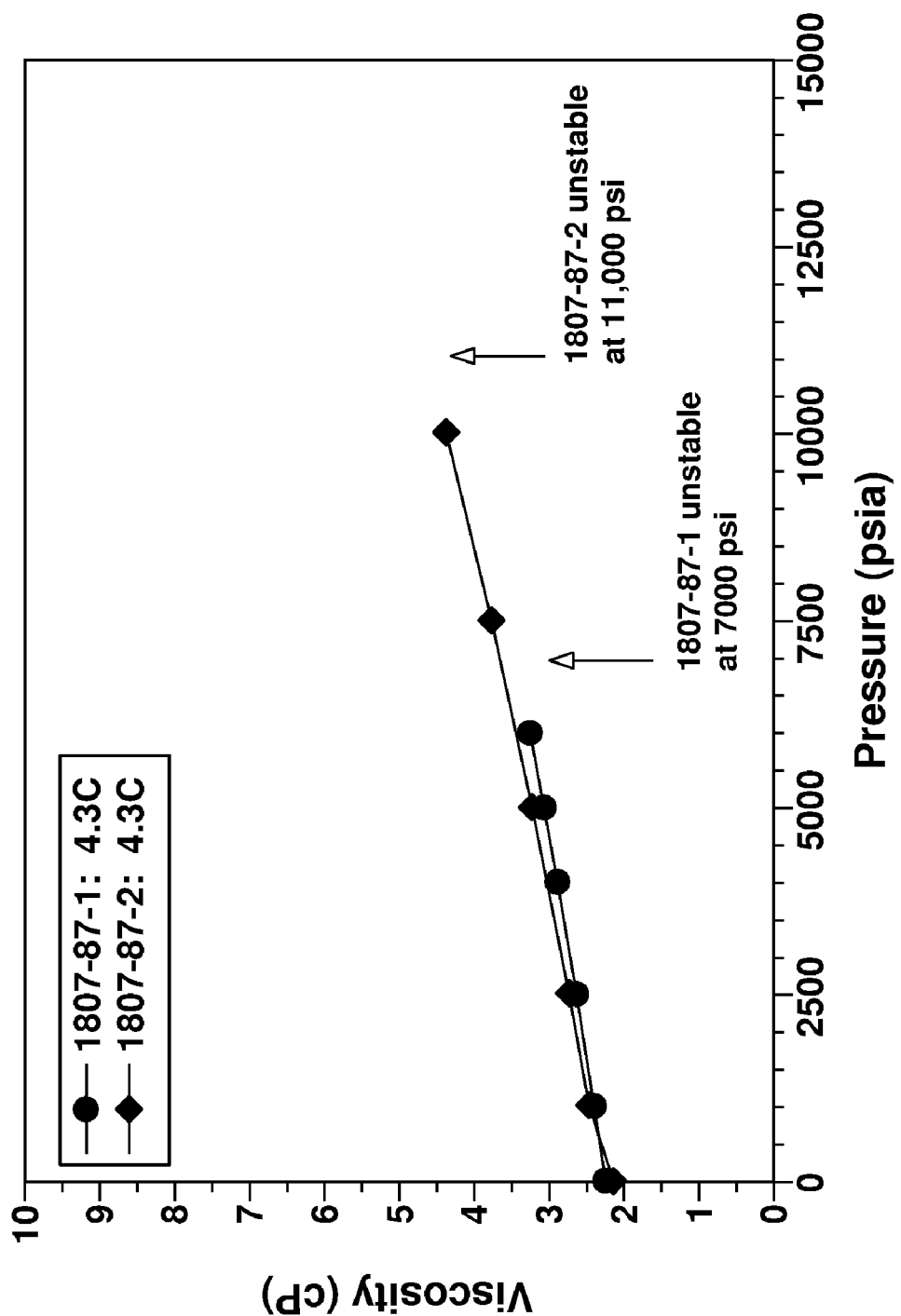
FIG. 1 is a graph of the viscosity data from Example 13 and Comparative Example 14.

In one aspect, the present invention is a paraffin inhibitor composition. In the art of oil and gas production, formation fluid containing hydrocarbons can include the materials known as waxes or paraffins. The paraffins normally present in petroleum hydrocarbons are high molecular weight straight or branched chain alkanes containing up to 100+ carbon atoms. Under certain conditions the precipitation of paraffin can result in deposits on surfaces and gelling of the hydrocarbon formation fluids. Both deposition and gelling can cause problems in the production of petroleum.

Paraffin deposition is typically of greatest concern in wells, flowlines, or pipelines carrying petroleum formation fluids. Paraffin deposition occurs when pipe and vessel surface temperatures are below the temperature at which paraffins will start to first precipitate from the formation fluid and below the bulk formation fluid temperature. Paraffin deposition is particularly problematic in arctic and deepwater subsea flowlines and pipelines due to the cold temperatures of these environments. The consistency of these paraffin deposits can range from being soft and mushy to very hard. Growth of paraffin deposits can range from a few millimeters to completely blocking flowlines.

Gelling of petroleum formation fluids can occur due to the formation of a crystalline paraffin lattice network within the fluids. This gelling can result in an increase in the viscosity of the fluid up to the point where the formation fluids will no longer flow.

Through deposition and gelling of petroleum fluids the precipitation of paraffins from petroleum formation fluids can reduce or even block the flow of the formation fluid through the wells, flowlines and pipelines carrying the formation fluid. The economic consequences of paraffin deposition and petroleum gelling in wells, flowlines, and pipelines can be great. In extreme cases, abandonment of multi-million dollar wells and flowlines may be required. In other cases, significant costs can be incurred from lost production, delayed production, and cleaning and remediation operations.

In addition to petroleum production through wells and pipelines, paraffin deposition occurs in other processes. Although the economic consequences of these processes are generally not as great as those in the wells and flowlines used in petroleum production, costs can be significant. Paraffin deposition has occurred in tanks, tank cars, separation vessels and other processing vessels resulting in solid residues that must be cleaned from the vessels. All of these conditions can be undesirable, causing reduced operating efficiencies, shut-in operations, cleaning costs and disposal costs.

The present invention is a paraffin inhibitor composition, that is a material that can be added to formation fluid to prevent or at least mitigate the crystalline growth and resultant deposition of paraffins or gelling of petroleum formation fluids. For purposes of the present invention, the term paraffin inhibitor means a material that can prevent or mitigate the formation of deposition of paraffins and/or gelling of petroleum formation fluids due to paraffin precipitation and crystalline growth. Also for the purposes of the present invention, the term formation fluids includes the fluid as it is removed from an oil an gas well, and also the fluid as it is dewatered and separated into its component parts, including but not limited to crude oil.

The active component of the paraffin inhibitors of the present invention is polymer paraffin inhibitors. The polymers of this group typically have both oleophilic and oleophobic characteristics. The oleophilic characteristics typically result from long alkyl side chains pending from the polymer backbone. The oleophobic characteristics of the polymer are typically the result of inclusions of heteroatoms such as oxygen, nitrogen, and the like into the polymer backbone itself or into short pendent groups. Exemplary polymers include but are not limited to olefin/maleic esters, olefin/maleic imides, ethylene vinyl acetates, alky phenol resins, and alkyl acrylates. The use of mixtures of these compounds as the active component of the compositions of the present invention is also within the scope of the present invention. Expressly included in the polymers that are useful with the present invention are those which have backbones or primary components selected from those listed above, but which have been further "modified" to include other functionality and the polymers function to prevent or mitigate the formation of paraffin deposits.

The compositions of the present invention include a first solvent selected from the weak to moderate wax solvents. For purposes of the present invention, the weak to moderate wax solvents are organic liquids in which a wax would have limited solubility such as single ring aromatic compounds that are liquid at ambient conditions. Exemplary weak to moderate wax solvents include but are not limited to benzene, toluene, xylene, ethyl benzene, propyl benzene, trimethyl benzene and mixtures thereof.

The compositions of the present invention include a second solvent selected from the strong wax solvents. For the purposes of the present invention, the strong wax solvents are organic liquids in which waxes have comparatively greater solubility than the weak to moderate wax solvents and include but are not limited to cyclopentane, cyclohexane, carbon disulfide, decalin and mixtures thereof.

The compositions of the present invention are preferably prepared by admixing the maximum amount of polymer into the solvent system that can be maintained in a pourable state at the intended use temperatures and pressures for the composition. The compositions of the present invention can be prepared by any method known to those of ordinary skill in the art of preparing polymer solutions to be useful. For example, the compositions of the present invention can be prepared by admixing the three components of the composition of the present invention together at ambient conditions or such mixing can be done at elevated temperatures. Preferably the mixing is done using an inert gas pad, such as nitrogen or carbon dioxide. The admixing can be done using active stirring or static mixers. The compositions of the present invention can be prepared using a continuous process wherein the polymer and solvents are metered into a mixer and fed into a vessel or in a batch process where a measured amount each component is charged to a vessel and admixed. A hybrid method of preparing the compositions of the present invention can be used wherein a batch of the polymer in a single solvent is prepared and then continuously admixed with the second solvent.

The solvent system of the present invention provides a surprising result in that the two component solvent system is superior to the use of either solvent alone. This synergism is particularly surprising in view of the polymers being the active component. A method of purifying polymers or isolating polymer oligomers is to first dissolve the polymer in a strong solvent and then slowly add a non-solvent or poorer solvent to the polymer solution. Depending upon how the method is practiced, the material of interest is precipitated and collected or else retained in the solvent polymer admixture and later isolated by removing the solvent system. In view of this process, it would be expected by one of ordinary skill in the art of preparing polymer admixtures that adding a second poorer solvent to a solution of polymer would result in less, not more solubility of the polymer.

In contrast, the solvent admixture of the present invention is a better solvent for the active component polymers than either solvent component when used alone. Preferably, the active component polymer is admixed with the solvent admixture wherein the weight ratio of the weak to moderate wax solvent to the strong wax solvent is from about 6:1 to about 1:6. More preferably the weight ratio of the weak to moderate wax solvent to the strong wax solvent is from about 4:1 to about 1:4. Most preferably, the ratio is 3:1.

The compositions of the present invention have a particularly desirable utility at lower temperatures. The solvent system of the present invention can depress the pour temperature of a polymer solution so that the composition can be used in colder applications. Preferably, the compositions of the present invention have a pour temperature that is at least 5° F. lower than a composition prepared using the same amount of polymer admixed in only the strong wax solvent. Even more preferably, the compositions of the present invention have a pour temperature that is at least 10° F. lower than a composition prepared using the same amount of polymer admixed in only the strong wax solvent. Most preferably, the compositions of the present invention have a pour temperature that is at least 15° F. lower than a composition prepared using the same amount of polymer admixed in only the strong wax solvent.

In one preferred embodiment, the present invention is a method for treating formation fluid from an oil and gas well comprising admixing formation fluid with a paraffin inhibitor including (a) a polymer having the characteristic of inhibiting paraffin crystalline growth; (b) a first solvent selected from the weak to moderate wax solvents; and (c) a second solvent selected from the strong wax solvents; wherein component (a) is dissolved in an admixture of components (b) and (c). The method of the present invention can be practiced in any way known to be useful to those of ordinary skill in the art of treating formation fluid with paraffin inhibitors. The compositions of the present invention can be injected into an oil and gas well or flowline at any point where it would be desirable to inhibit the deposition of paraffins. For example, the compositions of the present invention can be injected downhole at or near the producing section of the well. In the alternative, the compositions of the present invention can be injected near the top of the well or even into separation devices used to separate hydrocarbons from aqueous components of the formation fluid, or into other process streams containing petroleum formation fluids. The compositions of the present invention can be admixed with formation fluid alone or in combination with other additives, such as asphaltene, scale, and hydrate inhibitors.

Another preferred embodiment of the present invention is a composition of a formation fluid that has been treated to inhibit the formation of paraffins comprising an admixture of formation fluid and the paraffin inhibitor including (a) a polymer having the characteristic of inhibiting paraffin crystalline growth; (b) a first solvent selected from the weak to moderate wax solvents; and (c) a second solvent selected from the strong wax solvents; wherein component (a) is dissolved in an admixture of components (b) and (c). While the term formation fluid is used broadly with the present invention to include all components thereof, the compositions of the present invention are particularly useful in the hydrocarbon components of formation fluids. For example, after the formation fluid is separated to its gas components, hydrocarbon components, and aqueous components, the hydrocarbon component, commonly referred to in the art as crude oil or gas condensate, would be the components in which the compositions of the present invention would be most useful.

The phase behavior or stability of paraffin inhibitor polymer solutions at low temperatures can be greatly affected with pressure. Generally, other additives such as asphaltene inhibitors, corrosion inhibitors, demulsifiers, scale inhibitors, hydrate inhibitors, and defoamers do not exhibit similar behavior. This is of particular concern in applications of these products for deepwater applications where the products are typically pumped down a long subsea umbilical line to either a subsea wellhead or down into a subsea well. In the injection process, to be viable, the products must be stable at deepwater temperatures (~40° F.) and required injection pressures (~3000-15,000+ psi).

Use of a high pressure viscometer has been found to be particularly useful and sensitive for detecting signs of instability of products under pressure. It has been observed that the high pressure viscosity measurements of paraffin inhibitor solutions that become unstable exhibit unstable measurements which continue to drift upward over time wherein the drift observed is beyond the normal increase in viscosity with increasing pressure exhibited by most organic fluids.

The paraffin inhibitors of the present invention can be surprisingly stable at higher pressure than those prepared with conventional single solvent systems. Such pressures include 3000 psi, 4000 psi, 5000 psi, and even higher pressures. The advantages of this property include the ability to use the paraffin inhibitors of present invention at lower temperatures and/or higher pressures and/or with higher polymer concentrations than conventional paraffin inhibitors.

The paraffin inhibitors of the present invention are prepared with a binary solvent system. Solvent systems that include additional or different solvents in significant concentrations are not within the scope of the claimed invention. The term "significant concentration" means a concentration such that it would materially affect the performance of the solvent system in a paraffin inhibitor. The significant concentration would vary depending upon the specific in question. For example, a paraffin inhibitor that included more than 30 percent, by weight, of most solvents in additional to those claimed, as compared to the total weight of solvent used, would be outside of the scope of the present invention. For other solvents, this significant amount could be 25 percent, 20 percent, 15 percent, 10 percent, and even 5 percent.

While the present invention is directed primarily to production from oil and gas wells, the method and composition of the present invention can be used with any kind of process wherein there is a problem with the formation of paraffin deposits or hydrocarbon formation fluids gelling due to paraffin crystallization.

EXAMPLES

The following examples are provided to illustrate the present invention. The examples are not intended to limit the scope of the present invention and they should not be so interpreted. Amounts are in weight parts or weight percentages unless otherwise indicated.

Example 1

Solutions of paraffin inhibitors are prepared by admixing weighed amounts of solvent and an olefin maleic ester paraffin inhibitor having a nominal molecular weight of 5896. The samples are hand shaken with some occasional heating to dissolve the paraffin inhibitor. After insuring that all the paraffin inhibitor is dissolved, the samples are allowed to cool to room temperature prior to further cooling for gel testing.

The samples are further cooled by placing the samples in a refrigerated circulating bath set at 4° C. for a set period of time. Afterwards, the samples are removed and visually examined for whether the samples are gelled or have any noticeable precipitates. The observations of the samples after remaining at 4° C. are reported below in Table I.

TABLE I

| Duration | Solvent 1 | Solvent 2 | Ratio Solvent 1: Solvent 2 | Polymer Amount | Result |
|---|---|---|---|---|---|
| 1 hour | Toluene | Cyclohexane | 3:1 | 13.23% | NG |
| 1 hour | Toluene | Cyclohexane | 3:1 | 10.00% | NG |
| 1 hour | Toluene | — | — | 9.98% | GC |
| 1 hour | Toluene | — | — | 7.00% | GC |
| 24 hours | Toluene | Cyclohexane | 3:1 | 17.98% | GBP |
| 24 hours | Toluene | Cyclohexane | 3:1 | 15.66% | GBP |
| 24 hours | Toluene | Cyclohexane | 3:1 | 13.23% | NG |
| 24 hours | Toluene | — | — | 9.98 | GC |
| 24 hours | Toluene | — | — | 7.00 | GC |
| 24 hours | Toluene | — | — | 5.00 | GC |
| 24 hours | — | Cyclohexane | — | 14.99 | GBP |
| 24 hours | — | Cyclohexane | — | 9.89 | GBP |
| 24 hours | — | Cyclohexane | — | 6.27 | NG |
| 24 hours | Toluene | Cyclopentane | 3:1 | 24.99 | GC |
| 24 hours | Toluene | Cyclopentane | 3:1 | 17.75 | NG |
| 24 hours | Toluene | Cyclopentane | 3:1 | 15.03 | NG |
| 24 hours | — | Cyclopentane | — | 25.02 | NGS |
| 24 hours | — | Cyclopentane | — | 14.97 | NG |

NG means that the sample was not gelled.
GC means that the sample gelled completely.
GBP means that the sample was beginning to gel but not below pour point.
NGS means not gelled but solid layer on bottom of vessel.

Example 2

Example 1 is repeated substantially identically except that an olefin maleic ester paraffin inhibitor having a nominal molecular weight of 6456 is used. The observations of the samples after remaining at 4° C. are reported below in Table II.

TABLE II

| Duration | Solvent 1 | Solvent 2 | Ratio Solvent 1: Solvent 2 | Polymer Amount | Result |
|---|---|---|---|---|---|
| 24 hours | Toluene | Cyclohexane | 3:1 | 9.98% | GC |
| 24 hours | Toluene | Cyclohexane | 3:1 | 6.85% | GC |
| 24 hours | Toluene | Cyclohexane | 3:1 | 5.00% | GBP |
| 24 hours | Toluene | — | — | 10.00% | GC |
| 24 hours | Toluene | — | — | 3.95% | GC |
| 24 hours | Toluene | — | — | 2.99% | GBP |
| 24 hours | — | Cyclohexane | — | 2.99% | GC |
| 24 hours | Toluene | Cyclopentane | 3:1 | 9.96% | GC |
| 24 hours | Toluene | Cyclopentane | 3:1 | 5.95% | GBP |
| 24 hours | Toluene | Cyclopentane | 3:1 | 5.00% | GBP |
| 24 hours | — | Cyclopentane | — | 4.98% | NGBH |

NG means that the sample was not gelled.
GC means that the sample gelled completely.
GBP means that the sample was beginning to gel but not below pour point.
NGBH means not gelled but very hazy.

Example 3

Example 1 is repeated substantially identically except that an olefin maleic ester paraffin inhibitor having a nominal molecular weight of 5560 is used. The observations of the samples after remaining at 4° C. are reported below in Table III.

TABLE III

| Duration | Solvent 1 | Solvent 2 | Ratio Solvent 1: Solvent 2 | Polymer Amount | Result |
|---|---|---|---|---|---|
| 15 hours | Toluene | Cyclohexane | 3:1 | 45.94% | NG |
| 15 hours | Toluene | — | — | 44.91% | GC |
| 15 hours | Toluene | — | — | 40.60% | NG |

NG means that the sample was not gelled.
GC means that the sample gelled completely.

Example 4

Example 1 is repeated substantially identically except that an olefin maleic imide paraffin inhibitor having a nominal molecular weight of 5704 is used. The observations of the samples after remaining at 4° C. are reported below in Table IV.

TABLE IV

| Duration | Solvent 1 | Solvent 2 | Ratio Solvent 1: Solvent 2 | Polymer Amount | Result |
|---|---|---|---|---|---|
| 65 hours | Toluene | Cyclohexane | 3:1 | 45.19% | GBP |
| 65 hours | Toluene | Cyclohexane | 3:1 | 42.18% | GBP |
| 65 hours | Toluene | — | — | 45.52% | GC |
| 65 hours | Toluene | — | — | 42.97% | GC |

NG means that the sample was not gelled.
GBP means that the sample was beginning to gel but not below pour point.

Example 5

Example 1 is repeated substantially identically except that a "modified" ethylene vinyl acetate paraffin inhibitor, LD781.36 from EXXON® Chemicals, is used. The observations of the samples after remaining at 4° C. are reported below in Table V.

TABLE V

| Duration | Solvent 1 | Solvent 2 | Ratio Solvent 1: Solvent 2 | Polymer Amount | Result |
|---|---|---|---|---|---|
| 24 hours | Toluene | Cyclohexane | 3:1 | 12.04% | GBP |
| 24 hours | Toluene | Cyclohexane | 3:1 | 9.87% | GBP |
| 24 hours | Toluene | Cyclohexane | 3:1 | 7.96% | NG |
| 24 hours | Toluene | — | — | 12.25% | GC |
| 24 hours | Toluene | — | — | 10.01% | GC |
| 24 hours | Toluene | — | — | 8.02% | NG |
| 24 hours | — | Cyclohexane | — | 9.96% | GC |
| 24 hours | — | Cyclopentane | — | 8.00% | GC |

NG means that the sample was not gelled.
GC means that the sample gelled completely.
GBP means that the sample was beginning to gel but not below pour point.

Example 6

Example 1 is repeated substantially identically except that an alkyl acrylate paraffin inhibitor, CF25K from BAKER HUGHES® Petrolite, is used. The observations of the samples after remaining at 4° C. are reported below in Table VI.

TABLE VI

| Duration | Solvent 1 | Solvent 2 | Ratio Solvent 1: Solvent 2 | Polymer Amount | Result |
|---|---|---|---|---|---|
| 24 hours | Toluene | Cyclohexane | 4:1 | 4.98% | NG |
| 24 hours | Toluene | — | — | 4.99% | GBP |

NG means that the sample was not gelled.
GBP means that the sample was beginning to gel but not below pour point.

Example 7

Solutions of paraffin inhibitors are prepared by placing weighed amounts of solvent and the olefin maleic ester paraffin inhibitor tested in Example 2 into ½-oz square bottles to produce a 7% polymer solution. The samples are hand shaken with some moderate heating to dissolve the paraffin inhibitor. After insuring that all of the paraffin inhibitor is dissolved, the samples are allowed to cool to room temperature prior to cooling for gel testing.

The samples are then placed in a refrigerated circulating baths set at a fixed temperature for a period of 16 hours. Afterwards, the samples are removed and visually examined to determine whether the samples have any noticeable gel or precipitates present. The samples are evaluated at several temperatures in approximately 2° F. intervals such that the temperature at which gellation begins can be determined for each of the particular solutions.

The point of gellation is defined as the average of the lowest temperature above which no gel or obvious precipitates are observed and the highest temperature which some gel or obvious precipitates are noticed. Gelled solid refers to the solutions not flowing within 5 seconds upon turning the bottles 90° from vertical. The observations of the samples after remaining at 4° C. are reported below in Table VII.

TABLE VII

| Temp (° F.) | Toluene (S1) | Cyclohexane (S2) | 3:1 S1:S2 | 1:3 S1:S2 |
|---|---|---|---|---|
| 54.30 | Fluid | Fluid | Fluid | Fluid |
| 52.00 | Fluid but with gel | Fluid | Fluid | Fluid |
| 50.54 | Fluid but with gel | Fluid | Fluid | Fluid |
| 48.20 | Gelled Solid | Fluid - Hazy | Fluid | Fluid |
| 46.94 | Gelled Solid | Fluid but with gel | Fluid | Fluid |
| 45.14 | Gelled Solid | Gelled | Fluid | Fluid |
| 43.12 | Gelled Solid | Gelled Solid | Fluid but with gel | Fluid |
| 41.34 | Gelled Solid | Gelled Solid | Gelled Solid | Fluid but with gel |
| 39.47 | Gelled Solid | Gelled Solid | Gelled Solid | Gelled Solid |
| Gel Temp (° F.) = | 53.15 | 49.37 | 44.13 | 42.24 |

Example 8

The olefin maleic ester paraffin inhibitor tested in Example 1 is further tested to determine its pour point at variable concentrations in variable solvent systems using the following method:

(1) Place 8-10 ml of sample into a ½-oz bottle. Place an ASTM 5F thermometer (−30 to 120° F.) with stopper into the bottle. Place sample bottle in 115° F. temperature bath.
(2) Heat the sample to 115° F. Leave sample in bath for additional 30 minutes.
(3) Remove the bottle from the bath and place on counter at room temperature. Allow to cool to 90° F. Check the sample for the ability to pour by tilting the sample just enough to determine whether there is movement of the sample solution in the bottle. The solution is considered unable to pour when the solution is held horizontal in the bottle and no flow occurs for 5 seconds.
(4) Place the sample bottle in a 30° F. temperature bath. Check the sample for the ability to pour every 5° F. as it cools. If the sample reaches 40° F. and it still will pour, move the bottle to a 0° F. temperature bath.
(5) Continue checking the samples for the ability to pour at every 5° F. interval or as needed as it cools in the 0° F. bath. If the sample reaches 10° F. and it still shows movement, move the bottle to a −30° F. temperature bath.
(6) Continue checking the samples for the ability to pour every 5° F. intervals as it cools in the −30° F. bath.
(7) Report the pour point as the last 5° F. interval that was observed to have solution fluid movement prior the solution gelling and exhibiting no flow after being held horizontal for 5 seconds. If the solution still exhibits movement at the lowest obtainable temperature in the −30° F. temperature bath, list the pour point as less than the lowest 5° F. interval checked.

The observations of the pour points of the samples are reported in Table VIII.

TABLE VIII

| Paraffin Inhibitor Wt. % | Solvent - (Wt. % components) | Pour Point (° F.) |
|---|---|---|
| 14.97 | Toluene - (100) | 40 |
| 14.98 | Cyclohexane - (100) | 30 |
| 14.98 | Toluene/Cyclohexane - (74.92/25.08) | 25 |

TABLE VIII-continued

| Paraffin Inhibitor Wt. % | Solvent - (Wt. % components) | Pour Point (° F.) |
|---|---|---|
| 14.99 | Toluene/Cyclohexane - (50.00/50.00) | 25 |
| 14.99 | Toluene/Cyclohexane - (24.96/75.04) | 25 |

Example 9

The method of Example 8 is repeated substantially identically except that the olefin maleic ester paraffin inhibitor tested in Example 2 is used. The observations of the pour points of the samples are reported in Table IX.

TABLE IX

| Paraffin Inhibitor Wt. % | Solvent - (Wt. % components) | Pour Point (° F.) |
|---|---|---|
| 5.01 | Toluene - (100) | 45 |
| 5.00 | Cyclohexane - (100) | 45 |
| 4.99 | Toluene/Cyclohexane - (74.92/25.08) | 35 |
| 5.00 | Toluene/Cyclohexane - (50.00/50.00) | 30 |
| 4.96 | Toluene/Cyclohexane - (24.96/75.04) | 30 |
| 14.96 | Toluene - (100) | 50 |
| 15.01 | Cyclohexane - (100) | 50 |
| 15.01 | Toluene/Cyclohexane - (74.92/25.08) | 45 |
| 14.99 | Toluene/Cyclohexane - (50.00/50.00) | 40 |
| 14.98 | Toluene/Cyclohexane - (24.96/75.04) | 40 |
| 5.99 | Toluene - (100) | 45 |
| 6.00 | Decalin - (100) | 40 |
| 6.00 | Toluene/Decalin - (74.92/25.08) | 35 |
| 6.00 | Toluene/Decalin - (49.85/50.15) | 30 |
| 6.00 | Toluene/Decalin - (25.12/74.88) | 35 |
| 5.99 | Toluene - (100) | 45 |
| 5.99 | Cyclopentane - (100) | 30 |
| 6.00 | Toluene/Cyclopentane - (74.98/25.02) | 35 |
| 6.00 | Toluene/Cyclopentane - (50.00/50.00) | 30 |
| 6.00 | Toluene/Cyclopentane - (24.93/75.07) | 25 |

Example 10

The method of Example 8 is repeated substantially identically except that the olefin maleic imide paraffin inhibitor tested in Example 4 is used. The observations of the pour points of the samples are reported in Table X.

TABLE X

| Paraffin Inhibitor Wt. % | Solvent - (Wt. % components) | Pour Point (° F.) |
|---|---|---|
| 15.08 | Toluene - (100) | 0 |
| 15.00 | Cyclohexane - (100) | 40 |
| 15.00 | Toluene/Cyclohexane - (75.01/24.99) | −15 |
| 15.00 | Toluene/Cyclohexane - (50.00/50.00) | −20 |
| 15.00 | Toluene/Cyclohexane - (25.04/74.96) | −20 |

Example 11

The method of Example 8 is repeated substantially identically except that the alkyl acrylate paraffin inhibitor tested in Example 6 is used. The observations of the pour points of the samples are reported in Table XI.

TABLE XI

| Paraffin Inhibitor Wt. % | Solvent - (Wt. % components) | Pour Point (° F.) |
|---|---|---|
| 15.00 | Toluene - (100) | 50 |
| 15.00 | Cyclohexane - (100) | 50 |
| 15.01 | Toluene/Cyclohexane - (75.00/25.00) | 45 |
| 15.00 | Toluene/Cyclohexane - (50.00/50.00) | 40 |
| 14.85 | Toluene/Cyclohexane - (25.33/74.67) | 45 |

Example 12

The method of Example 8 is repeated substantially identically except that the alkyl phenol resin paraffin inhibitor LUBRIZOL® 8202 from Lubrizol Corporation is used. The observations of the pour points of the samples are reported in Table XII.

TABLE XII

| Paraffin Inhibitor Wt. % | Solvent - (Wt. % components) | Pour Point (° F.) |
|---|---|---|
| 15.01 | Toluene - (100) | 20 |
| 15.01 | Cyclohexane - (100) | 40 |
| 15.01 | Toluene/Cyclohexane - (75.00/25.00) | 10 |
| 14.85 | Toluene/Cyclohexane - (25.33/74.67) | −5 |

Example 13

An paraffin inhibitor is prepared by admixing: 22.79 wt. % M2294, an olefin maleic ester available from BAKER HUGHES PETROLITE; 57.91 wt. % toluene; and 19.30 wt. % cyclohexane. A high pressure viscometer (Cambridge Viscosity SPL440 Viscometer) is used to determine the stability of the paraffin inhibitor under pressure at a constant temperature of 4.3° C. It has been observed that the high pressure viscosity measurements of paraffin inhibitor solutions that become unstable exhibit unstable measurements which continue to drift upward over time where the upward drift exceeds the normal increase in viscosity with increasing pressure exhibited by most organic fluids. The results are recorded below in Table XIII and in the figure. The data for this experiment is labeled 1807-87-2 in the figure.

TABLE XIII

High Pressure Viscosity - 4.3° C.

| Temp (C.) | Pressure (psia) | Viscosity (cP) |
|---|---|---|
| 4.4 | 15 | 2.142 |
| 4.3 | 1027 | 2.464 |
| 4.3 | 2527 | 2.733 |
| 4.3 | 5010 | 3.225 |
| 4.3 | 7511 | 3.769 |
| 4.3 | 10022 | 4.372 |
| 4.3 | 11007 | Becomes Unstable |

Comparative Example 14

Example 13 is repeated substantially identically except that 77.21 percent of toluene is used as the solvent. The results are recorded below in Table XIV and in the figure. The data for this experiment is labeled 1807-87-1 in the figure.

TABLE XIV

| High Pressure Viscosity - 4.3° C. | | |
| --- | --- | --- |
| Temp (C.) | Pressure (psia) | Viscosity (cP) |
| 4.3 | 21 | 2.248 |
| 4.3 | 1019 | 2.398 |
| 4.3 | 2514 | 2.632 |
| 4.3 | 4017 | 2.887 |
| 4.3 | 5009 | 3.067 |
| 4.3 | 6009 | 3.254 |
| 4.3 | 7017 | Becomes Unstable |

What is claimed is:

1. A method for treating formation fluid from an oil and gas well comprising admixing a paraffin inhibitor composition with a formation fluid wherein the paraffin inhibitor composition consists essentially of:
   (a) a polymer having the characteristic of inhibiting paraffin crystalline growth;
   (b) a first solvent selected from benzene, toluene, xylene, ethyl benzene, propyl benzene, trimethyl benzene and mixtures thereof; and
   (c) a second solvent selected from cyclopentane, cyclohexane, carbon disulfide, decalin and mixtures thereof;
   wherein component (a) is dissolved in an admixture of components (b) and (c); wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof, and wherein the weight ratio of the first solvent to the second solvent is from about 6:1 to about 1:6.

2. The method of claim 1 wherein the paraffin inhibitor composition is admixed with a formation fluid within a wellbore or flowline.

3. The method of claim 2 wherein the paraffin inhibitor composition is admixed with a formation fluid by injecting the paraffin inhibitor composition into process devices handling hydrocarbons from formation fluids.

4. The method of claim 1 wherein the first solvent is toluene.

5. The method of claim 4 wherein the second solvent is cyclohexane.

6. The method of claim 4 wherein the second solvent is cyclopentane.

7. The method of claim 4 wherein the second solvent is decalin.

8. The method of claim 1 wherein the weight ratio of the first solvent to the second solvent is from about 4:1 to about 1:4.

9. The method of claim 8 wherein the weight ratio of the first solvent to the second solvent is about 3:1.

10. The method of claim 1 wherein the composition has a pour point at least 5° F. lower than a composition of the same polymer at the same concentration in only the second solvent.

11. The method of claim 10 wherein the composition has a pour point at least 10° F. lower than a composition of the same polymer at the same concentration in only the second solvent.

12. The method of claim 11 wherein the composition has a pour point at least 15° F. lower than a composition of the same polymer at the same concentration in only the second solvent.

13. The method of claim 1 wherein the formation fluid includes an aqueous component and a hydrocarbon component.

14. The method of claim 1 wherein the formation fluid is crude oil.

15. The method of claim 1 wherein the formation fluid is gas condensate.

16. A process for treating an oil well with a paraffin inhibitor comprising injecting the paraffin inhibitor downhole into the oil well wherein the paraffin inhibitor consists essentially of:
   (a) a polymer having the characteristic of inhibiting paraffin crystalline Growth;
   (b) a first solvent selected from benzene, toluene, xylene, ethyl benzene, propyl benzene, trimethyl benzene and mixtures thereof; and
   (c) a second solvent selected from cyclopentane, cyclohexane, carbon disulfide, decalin and mixtures thereof;
   wherein component (a) is dissolved in an admixture of components (b) and (c); wherein the polymer having the characteristic of inhibiting paraffin crystalline growth in formation fluid is selected from the group consisting of olefin/maleic esters, olefin/maleic imides, ethylene vinyl acetates, alky phenol resins, alkyl acrylates, and mixtures thereof, and wherein the weight ratio of the first solvent to the second solvent is from about 6:1 to about 1:6.

17. The process of claim 16 wherein the pressure downhole is at least 3000 psi.

* * * * *